US012072603B2

(12) United States Patent
Li et al.

(10) Patent No.: US 12,072,603 B2
(45) Date of Patent: Aug. 27, 2024

(54) DOUBLE-LAYER ELECTRODE FOR ELECTRO-OPTIC LIQUID CRYSTAL LENS

(71) Applicant: e-Vision Smart Optics, Inc., Sarasota, FL (US)

(72) Inventors: Liwei Li, Tempe, AZ (US); Anthony Van Heugten, Sarasota, FL (US); Dwight P. Duston, Laguna Niguel, CA (US); Phil Bos, Hudson, OH (US); Douglas Bryant, Aurora, OH (US)

(73) Assignees: e-Vision Smart Optics, Inc., Sarasota, FL (US); Kent State University, Kent, OH (US)

( * ) Notice: Subject to any disclaimer, the term of this patent is extended or adjusted under 35 U.S.C. 154(b) by 0 days.

(21) Appl. No.: 18/055,061

(22) Filed: Nov. 14, 2022

(65) Prior Publication Data

US 2023/0089097 A1    Mar. 23, 2023

Related U.S. Application Data

(63) Continuation of application No. 17/175,050, filed on Feb. 12, 2021, now Pat. No. 11,513,416, which is a
(Continued)

(51) Int. Cl.
*G02F 1/29*    (2006.01)
*G02B 30/00*    (2020.01)
(Continued)

(52) U.S. Cl.
CPC ............... *G02F 1/29* (2013.01); *G02B 30/00* (2020.01); *G02F 1/133345* (2013.01);
(Continued)

(58) Field of Classification Search
None
See application file for complete search history.

(56) References Cited

U.S. PATENT DOCUMENTS

| 4,195,917 A | 4/1980 | Kuwagaki et al. |
| 4,277,147 A | 7/1981 | Arnoldussen |

(Continued)

FOREIGN PATENT DOCUMENTS

| CN | 102804000 A | 11/2012 |
| JP | S5577724 A | 6/1980 |

(Continued)

OTHER PUBLICATIONS

Baeck, et al. (2002). Controlled Electrodeposition of Nanoparticular Tungsten Oxide. Nano Letters. vol. 2, No. 8, 831-834.
(Continued)

*Primary Examiner* — Phu Vu
(74) *Attorney, Agent, or Firm* — Smith Baluch LLP

(57) ABSTRACT

Certain exemplary embodiments can provide a system, machine, apparatus, device, manufacture, circuit, composition of matter, and/or user interface adapted for and/or resulting from, and/or a process, method, and/or machine-readable medium comprising machine-implementable instructions for, activities that can comprise and/or relate to, generating a gradient in an index of refraction of a material.

17 Claims, 11 Drawing Sheets

Related U.S. Application Data continuation of application No. 16/444,607, filed on Jun. 18, 2019, now Pat. No. 10,955,707, which is a continuation of application No. 15/487,934, filed on Apr. 14, 2017, now Pat. No. 10,345,656, which is a continuation of application No. 14/649,708, filed as application No. PCT/US2013/077467 on Dec. 23, 2013, now Pat. No. 9,625,767.

(60) Provisional application No. 61/746,754, filed on Dec. 28, 2012.

(51) Int. Cl.
G02F 1/1333 (2006.01)
G02F 1/1343 (2006.01)

(52) U.S. Cl.
CPC .... *G02F 1/134309* (2013.01); *G02F 1/13439* (2013.01); *G02F 1/294* (2021.01)

(56) References Cited

U.S. PATENT DOCUMENTS

| | | | |
|---|---|---|---|
| 4,390,246 A | 6/1983 | Miyoshi | |
| 4,447,133 A | 5/1984 | Miyoshi | |
| 4,488,781 A | 12/1984 | Giglia | |
| 4,573,768 A | 3/1986 | Polak et al. | |
| 5,032,543 A | 7/1991 | Black et al. | |
| 5,206,756 A | 4/1993 | Cheshire | |
| 5,277,986 A | 1/1994 | Cronin et al. | |
| 5,404,244 A | 4/1995 | Dine et al. | |
| 5,666,771 A | 9/1997 | Macquart et al. | |
| 5,825,526 A | 10/1998 | Bommarito et al. | |
| 5,995,271 A | 11/1999 | Zieba et al. | |
| 6,159,639 A | 12/2000 | Wen et al. | |
| 6,213,602 B1 | 4/2001 | Smarto | |
| 6,243,063 B1 | 6/2001 | Mayhew et al. | |
| 6,365,968 B1 | 4/2002 | Qian et al. | |
| 6,767,624 B2 | 7/2004 | Bronstert | |
| 7,265,890 B1 | 9/2007 | Demiryont | |
| 7,593,154 B2 | 9/2009 | Burdis et al. | |
| 9,470,937 B2 | 10/2016 | Li et al. | |
| 9,625,767 B2 | 4/2017 | Duston et al. | |
| 10,061,175 B2 | 8/2018 | Trajkovska-Broach et al. | |
| 10,345,656 B2 | 7/2019 | Li et al. | |
| 10,955,707 B2 | 3/2021 | Li et al. | |
| 11,513,416 B2 | 11/2022 | Li et al. | |
| 2003/0156313 A1 | 8/2003 | Serra et al. | |
| 2004/0108984 A1* | 6/2004 | Ogasawara | G02F 1/29 |
| 2005/0140896 A1* | 6/2005 | Chae | G02F 1/134363 349/141 |
| 2005/0231677 A1 | 10/2005 | Meredith | |
| 2005/0248824 A1 | 11/2005 | Fukazawa et al. | |
| 2006/0164593 A1* | 7/2006 | Peyghambarian | G02F 1/29 349/200 |
| 2007/0041074 A1 | 2/2007 | Mathey et al. | |
| 2007/0089784 A1 | 4/2007 | Noh et al. | |
| 2007/0097481 A1 | 5/2007 | Burdis et al. | |
| 2008/0304131 A1 | 12/2008 | Nguyen | |
| 2009/0008031 A1 | 1/2009 | Gould et al. | |
| 2009/0033863 A1 | 2/2009 | Blum et al. | |
| 2009/0237575 A1 | 9/2009 | Tsi-Shi | |
| 2009/0316248 A1 | 12/2009 | Karmhag et al. | |
| 2010/0079846 A1 | 4/2010 | Mazurkiewicz et al. | |
| 2010/0165440 A1 | 7/2010 | Nguyen et al. | |
| 2010/0245973 A1 | 9/2010 | Wang et al. | |
| 2010/0308253 A1 | 12/2010 | Swift et al. | |
| 2010/0313875 A1 | 12/2010 | Kennedy | |
| 2011/0025955 A1 | 2/2011 | Bos et al. | |
| 2011/0075248 A1 | 3/2011 | LeCain et al. | |
| 2011/0234934 A1 | 9/2011 | Chang | |
| 2012/0075569 A1* | 3/2012 | Chang | G02F 1/29 349/200 |
| 2012/0120476 A1 | 5/2012 | Yeh et al. | |
| 2012/0120477 A1 | 5/2012 | Biver et al. | |
| 2012/0134004 A1 | 5/2012 | Melcher et al. | |
| 2012/0147448 A1 | 6/2012 | Yaniv et al. | |
| 2012/0162744 A1 | 6/2012 | Lee et al. | |
| 2012/0188490 A1 | 7/2012 | Zohrabyan et al. | |
| 2014/0139768 A1 | 5/2014 | Galstian et al. | |
| 2015/0219974 A1 | 8/2015 | Trajkovska-Broach et al. | |
| 2015/0301427 A1* | 10/2015 | Galstian | G02F 1/13471 349/139 |
| 2016/0038277 A1 | 2/2016 | Dai et al. | |
| 2017/0242317 A1 | 8/2017 | Li et al. | |
| 2019/0137837 A1 | 5/2019 | Trajkovska-Broach et al. | |

FOREIGN PATENT DOCUMENTS

| | | |
|---|---|---|
| JP | 2000509161 A | 7/2000 |
| JP | 2002513175 A | 5/2002 |
| JP | 2002170557 A | 6/2002 |
| JP | 2003156767 A | 5/2003 |
| JP | 2004093687 A | 3/2004 |
| JP | 2007052236 A | 3/2007 |
| JP | 2012137747 A | 7/2012 |
| JP | 2007108750 B | 2/2014 |
| TW | 200725012 A | 7/2007 |
| WO | 2004053196 A1 | 6/2004 |
| WO | 2008003004 A2 | 1/2008 |
| WO | 2013016318 A2 | 1/2013 |

OTHER PUBLICATIONS

Corrected Notice of Allowability dated Jan. 17, 2017 from U.S. Appl. No. 14/649,708, 4 pages.
Haddock, "Liquid Crystal Based Electro-Opti Diffractive Spectacle Lenses and Low Operating Voltage Nematic Liquid Crystals," University of Arizon, Jan. 1, 2005, 131 pages.
International Search Report and Written Opinion dated May 15, 2014 from International Application No. PCT/US2013/077467, 8 pages.
Le Bellac, D. et al., "Angular selective transmittance through electrochromic tungsten oxide films made by oblique angle sputtering," Appl. Phys. Lett. 66, 1715-1716 (1995); https://doi.org/10.1063/1.113343.
Non-Final Office Action dated May 12, 2016 from U.S. Appl. No. 14/649,708, 7 pages.
Notice of Allowance dated Dec. 27, 2016 from U.S. Appl. No. 14/649,708, 7 pages.

* cited by examiner $$\eta \propto \left(\sin\left(\pi/q\right)/\left(\pi/q\right)\right)^2$$

$$OPD(r) \approx -\frac{r^2}{2\lambda f}$$

Figure 7

$$\frac{r_n^2}{2\lambda f} = \frac{n}{N} \cdot OPD(R)$$

$$n = 1, 2, \ldots, N$$

Figure 8

$$r_n = \sqrt{\frac{2\lambda f n}{f_s}}$$

Figure 9

$$r_{m,n} = \sqrt{\frac{2\lambda fn(m + M(n-1))}{f_s}} \quad n=1,2,\ldots,N/M \quad m = M$$

$$r_{m,n} = \sqrt{\frac{2\lambda fn(m + M(n-1))}{f_s}}, \quad n=1,2,\ldots,N/M, \quad m = 1,2,\ldots,M-1$$

$$r_{m,n} = \sqrt{\frac{2\lambda fn(m + M(n-1))}{f_s}} \quad n=1,2,\ldots,\lfloor N/M \rfloor+1, \quad m = 1,2,\ldots,Mod$$

$$r_{m,\lfloor N/M \rfloor+2} = R$$

Figure 14

$$r_{m,\lfloor N/M \rfloor+1} = R$$

Figure 15

$$\frac{r^2}{2\lambda f} \cdot \frac{\frac{\Delta d}{r}}{1-\eta} \propto c$$

Figure 16

$$\frac{r^2}{2\lambda f} \cdot \frac{\Delta d}{r} = \frac{\Delta d \cdot r}{2\lambda f}$$

Figure 17

DOUBLE-LAYER ELECTRODE FOR ELECTRO-OPTIC LIQUID CRYSTAL LENS

CROSS-REFERENCES TO RELATED APPLICATIONS

This application is a continuation of U.S. application Ser. No. 17/175,050, filed 12 Feb. 2021, which is a continuation of U.S. application Ser. No. 16/444,607, now U.S. Pat. No. 10,955,707, filed 18 Jun. 2019, which is a continuation of U.S. application Ser. No. 15/487,934, now U.S. Pat. No. 10,345,656, filed 14 Apr. 2017, which in turn is a continuation of U.S. application Ser. No. 14/649,708, now U.S. Pat. No. 9,625,767, filed 4 Jun. 2015, which is a national-stage entry of International Application No. PCT/US13/77467, filed 23 Dec. 2013, which in turn claims priority to, and incorporates by reference herein in its entirety, U.S. Provisional Patent Application 61/746,754, filed 28 Dec. 2012.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 7 is an exemplary equation;

FIG. 8 is an exemplary equation;

FIG. 9 is an exemplary equation;

FIG. 12 is an exemplary equation;

FIG. 13 is an exemplary equation;

FIG. 14 is an exemplary equation;

FIG. 15 is an exemplary equation;

FIG. 16 is an exemplary equation;

FIG. 17 is an exemplary equation;

DESCRIPTION

Variable-focus electro-optic lenses can utilize a birefringent material such as liquid crystal ("LC") to achieve gradients in their index of refraction. Designs for such LC lenses can be based on various architectures such as kinoform relief patterns etched into a transparent substrate, lens-shaped cavities filled with variable-index birefringent material, and/or patterned transparent electrodes structures grown, deposited, applied, and/or etched on substrates. In the last example, transparent electrodes, most commonly built using indium tin oxide (ITO), can be used to create a gradient in the electric field across a liquid crystal layer. This field can create a gradient in the index of refraction, which, if properly established, can result in lensing action in the device.

Figure 1:
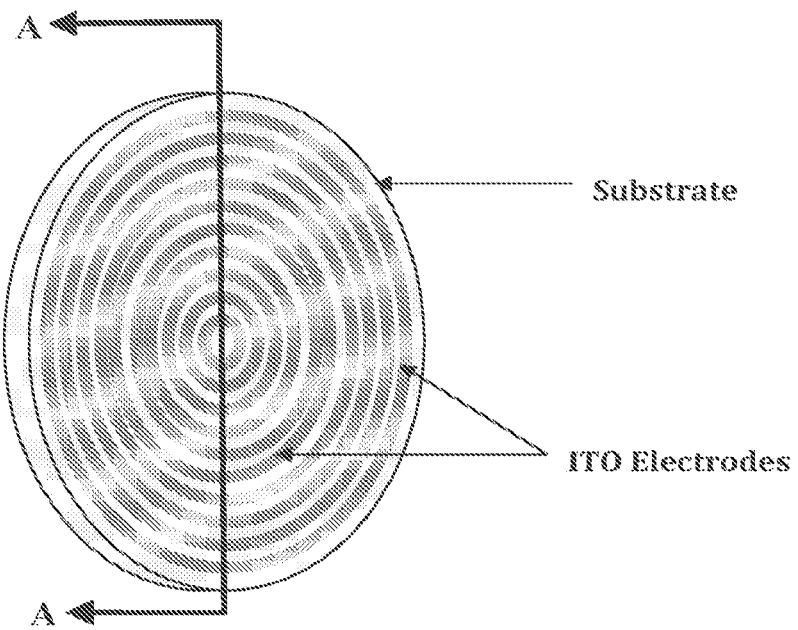
FIG. 1 is a perspective view of an exemplary embodiment of a substrate of an electro-active lens.
Figure 2:
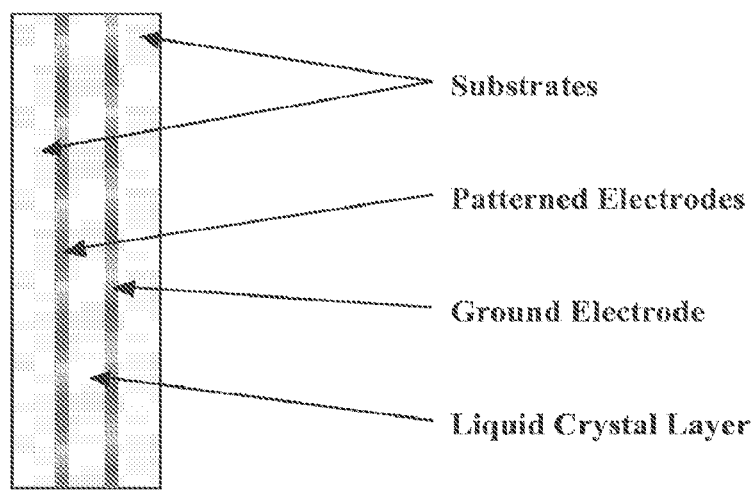
FIG. 2 is a cross-sectional view taken at section A-A of FIG. 1.

As shown in FIG. 1, a layer of ITO can be deposited on a glass and/or plastic substrate that then can be subjected to a photolithography process to pattern the transparent electrodes. In the case of a lens with spherical focus, this electrode pattern can include concentric rings of increasing radii, separated by electrically insulating gaps, typically a few micrometers wide, such as from approximately 0.1 to approximately 10 µm. A second substrate containing a contiguous (non-patterned) electrode layer can be placed (perhaps with some separation created by a layer of liquid crystal ("LC") that typically can be approximately 1 to approximately 25 µm thick) adjacent to the first substrate with the electrodes facing each other, and the thin layer of liquid crystal can be sandwiched and/or hermetically sealed between them, as shown in FIG. 2.

When an appropriate voltage array is connected to these ring electrodes and the second contiguous electrode is grounded to the circuit with respect to the patterned electrode potentials, an electric field can be created across the LC layer. That electric field can be proportional to the local voltage applied and/or the voltage differential across the LC layer. Thus, with an appropriate radial spatial gradient in the field, a radial gradient in the index of refraction in the LC layer can result, and the optical function of a spherical lens can be provided.

One potential issue associated with such a lens design that uses patterned transparent electrodes separated by thin regions of insulation is that the edges of the electrodes can act as sites for light diffraction. That is, when a lightwave impinges on the electro-optic LC lens, some of the light can suffer diffraction around the edges of each electrode. This diffracted light will not necessarily be focused correctly onto the image focal plane of the lens, potentially resulting in stray light losses in the image. Moreover, this stray diffracted light can cause degradation of the finely-focused image on the focal plane, creating haze and/or a fuzzy image. This can result in a lens that can have poor focusing quality, and/or one that can be improved if these diffractive losses can be eliminated or reduced. Another potential issue with the thin regions between the rings is that unwanted cross currents of electric fields can arise, disrupting the desired orientation of the liquid crystal. Yet another potential issue with the thin regions between the rings is that any liquid crystal not oriented by either the wanted or unwanted electric fields can orient in an undesired direction, potentially causing some light to be directed into an unwanted direction, which can degrade the lens performance.

Figures 3, 4:
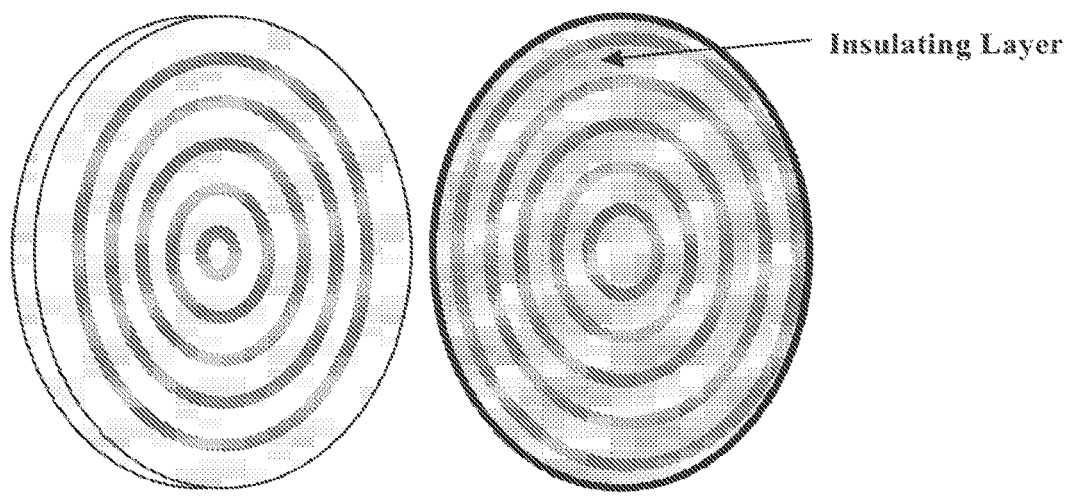
FIG. 3 is a perspective view of an exemplary embodiment of a pair of substrates of an electro-active lens.
FIG. 4 is an exemplary equation.

One method of reducing and/or eliminating the potential light losses discussed above is to eliminate the transparent gaps between electrodes while maintaining their electrical isolation from each other. Thus, certain exemplary embodiments can split the electrode layer into two distinct layers located adjacent to each other, each layer separated from the other by a contiguous insulating layer formed from, for example, silicon dioxide. The first electrode layer can be fabricated on the transparent substrate. However, every other electrode can be left un-etched and/or un-applied. For example, counting electrode circles from, for example, the center-most one, electrodes 1, 3, 5, 7, etc. can remain on electrode layer #1, separated by insulating gaps. Then, an insulating layer can be deposited onto electrode layer #1. On top of that, a second electrode layer (#2) can be fabricated that can include the alternating electrodes 2, 4, 6, 8, etc., with insulating gaps between them, as shown in FIG. 3. Thus, half of the electrodes can appear on one electrode layer, and the other half on the other.

The electrode layers can be grown, etched, and/or applied such that the electrodes in layer #2 can be positioned nearly exactly over the insulating gaps between electrodes in layer #1 and vice versa. Thus, when viewing the two-layer electrode structure, as seen by an impinging lightwave, there can appear to be no insulating gaps between electrodes, since the electrode layers can be closely spaced (e.g., such as from approximately 0.1 micrometers to approximately 10 micrometers apart). If the lightwave does not "see" any electrode edges, such as those defined by insulating gaps, the diffraction around these edges can be effectively minimized and/or nullified.

In certain exemplary embodiments, the buss lines that connect the electrode rings to the electrical power supply can connect to two separate electrode layers. This can be accomplished using vias through the insulating layer, thereby allowing all the buss lines to be deposited on either the substrate or the insulating layer.

In certain exemplary embodiments, the buss lines that connect the electrode rings to the electrical power supply can connect to only a single electrode layer, and the other electrode layer remains unconnected. Electrical power from the electrically connected rings can be transferred to the unconnected rings via capacitance and/or inductance.

Multiple layers of electrodes with multiple layers of liquid crystal associated with each layer can be utilized to increase the optical power of the lens. For example, a single layer of electrodes, with or without its second layer for correcting the issues caused by the unwanted gaps, and the corresponding layer of liquid crystal associated with that layer or layers of electrodes, can be used to create a lens of one diopter of optical power. A second (or third or more) layer of liquid crystal and its associated layer(s) of electrodes can be utilized in optical communication with the first layer assembly to increase the overall optical power of the two lenses working together, such as instead of one lens having an optical power of one diopter, two lenses can have a total optical power of two diopters.

When designing these types of LC lenses, using more rings per the amount of light bending desired from the lens can produce better optical result. The design term often used for this aspect is "electrodes per wave." Thus, using more electrodes per wave of light retardation can form a smaller point of light at the focal plane of the lens. When using two or more liquid crystal lenses in series to increase optical power, the number of wavelengths of light can be increased, but if the number of electrodes used per lens remains the same in each, the "electrodes per wave" ratio can decrease, potentially reducing the optical quality of the lenses. An approach for mitigating this issue is herein disclosed. The approach disclosed herein not only can be utilized for mitigating the reduction of optical quality, it also can be utilized to improve the off-axis light performance of the lens.

Generally speaking, stacking two identical ideal thin lenses exactly on top of each other can double the optical power, and the total phase profile can stay ideally parabolic. As a result, the optical performance need have no difference from a single ideal thin lens with the half focal length.

Therefore, a quick and initial conclusion might be easily drawn that stacking two identical LC lenses can double the optical power and/or the challenge can be solved. However, the case can be different for liquid crystal ("LC") lenses with discrete ring electrodes. For a single LC lens, the phase profile can be sampled to steps, and/or the optical efficiency can be related to the discretization of the profile, which can be modeled and/or analytically described using the formula shown in FIG. 4.

Here, q is the number of phase steps per wavelength, and q is the optical efficiency. Thus, the number of steps per wavelength or "sampling rate" can have a significant effect on the efficiency, and generally, more phase steps can be desired rather than less.

Figure 5:
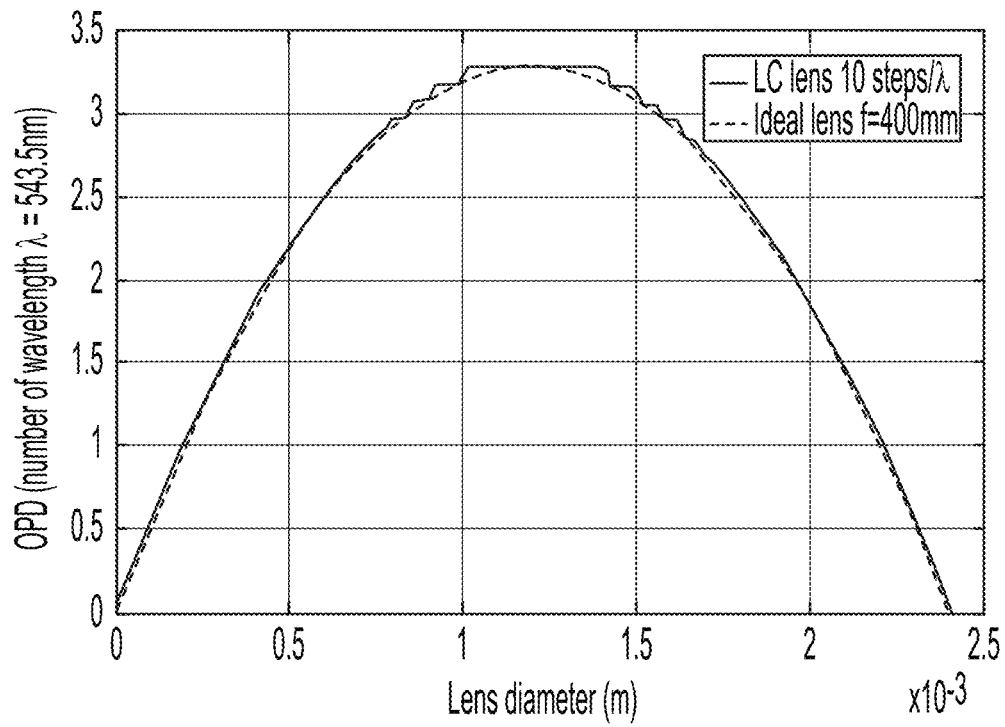
FIG. 5 is an exemplary phase profile plot.
Figure 6:
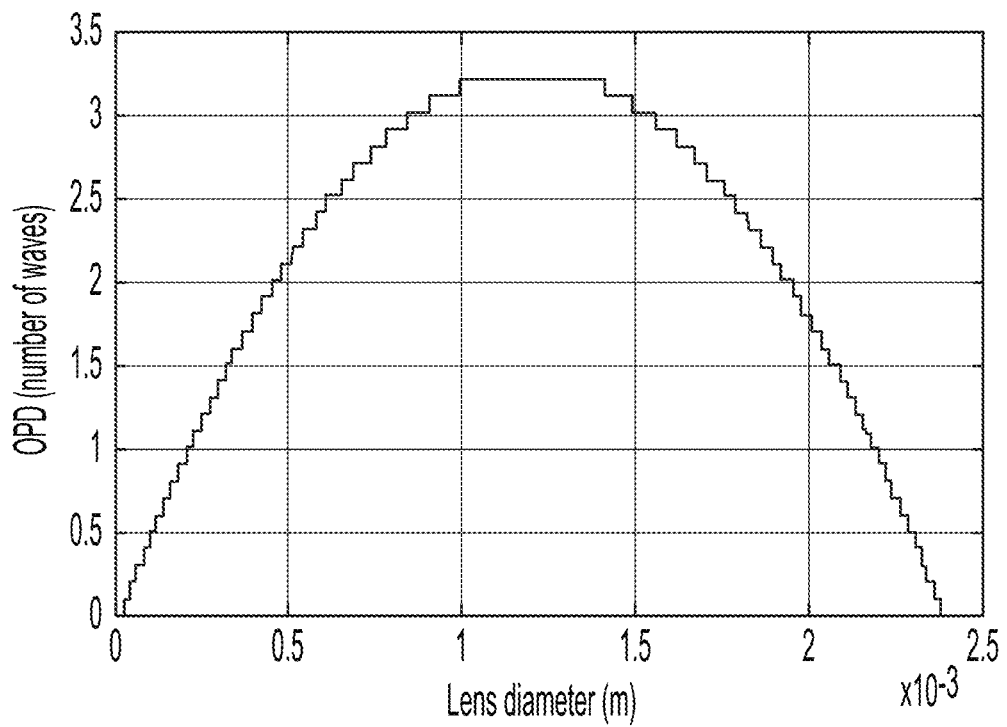
FIG. 6 is an exemplary phase profile plot.

The optical efficiency of the single lens can be a function of the number of phase steps, whether evaluated analytically or empirically. As a demonstration of this effect, FIG. 6 presents an exemplary plot of optical path distance (OPD) versus lens diameter for an exemplary LC lens. Note that the sampled phase profile is plotted as stairs with sharp edges. For such an exemplary lens, the analytical efficiency can reach about 96.8%. Yet, the profile can be much smoother between steps (because there are more steps per wavelength), as shown in FIG. 5, so that a higher efficiency can be obtained. In particular, FIG. 5 presents a plot for an ideal LC lens and a plot for an exemplary LC lens having a sampling rate of 10 phase steps per wavelength and a focal length f=400 mm, and demonstrating smoother transitions between steps.

FIG. 5 shows a plot of a phase profile of an exemplary LC lens with smoothness between steps, and FIG. 6 shows a plot of an exemplary sampled phase profile with sharper steps.

In general, if two identical LC lens are attached with their active area exactly on top of each other, and no separation between them is considered, the optical power can be doubled with the basic shape of the total phase profile being parabolic. However, the effective number of ring electrodes across the aperture can stay the same, i.e., the resultant sampling rate can become only half of the single lens, and the efficiency can be greatly dropped.

We have calculated that stacking the above stair profile has only 5 phase steps per wavelength of the light, and calculated the strehl ratio at the focal plane z=200 mm to be only 87.36% of the ideal lens, which is the same that the efficiency equation shown in FIG. 4 gives with this sampling rate. If the smoother LC profile is used, a 94% strehl ratio is obtained, normalized to the result for the case of an ideal lens.

Therefore, a dominating factor for the efficiency of the stack can be the effective sampling rate across the lens aperture. To address this factor, we can make slightly different designs of electrode pattern for each component lens, so that when they are on top of each other, their electrodes can become partially overlapped, and a high overall sampling rate for the stack can be achieved.

To obtain the exact dimensions for the electrode pattern on each lens, we can start from the objective optical power and phase sampling of the stack, and the profile with staircase structure can be used to model the discrete phase steps, such that no smoothness between steps is expected.

When the objective focal length f and lens radius R are known, the total OPD of the ideal lens in unit of number of waves (1 is the design wavelength) can be obtained, as per the formula shown in FIG. 7.

If the sampling rate $f_s$ (i.e., the number of phase steps per wave) is known to represent the continuous phase profile, the total number of rings N can be obtained in the formula shown in FIG. 8, assuming the area of each electrode has an equal amount of the fraction of the unit wave and/or the area of each ring is substantially the same. Therefore, if no gaps are considered, the outer radius of each ring electrode can be obtained using the formula shown in FIG. 9.

Here, n is the index number of each ring electrode. In the case of a stack, each ring's index can be due to the combined effects of electrode patterns for each component lens, and/or the calculated outer radius of each ring can be used to assign the outer radius of each electrode on each component lens in sequence. For example, if a stack has two lenses, e.g., a lens number one and a lens number two, the outer radius of the first electrode in the center of lens number one can be substantially the same as the outer radius of first ring of the stack, and for lens number two, the first electrode can have a radius substantially the same as the outer radius of the second ring in the stack. Likewise, the outer radius of the third ring can be substantially the same as that of the second electrode of lens number one, and the radius of the fourth ring can be substantially the same as that of the third electrode of lens number two. This arrangement can continue to the very outermost ring of the stack, both lenses can have the same size of active area and/or the radius of the outermost ring can be the same as the radius of the lens. In the case of a stack with two lenses, the radius of the odd and even numbered rings in the stack can determine the electrode patterns of the two component lenses, respectively.

Figure 10A:
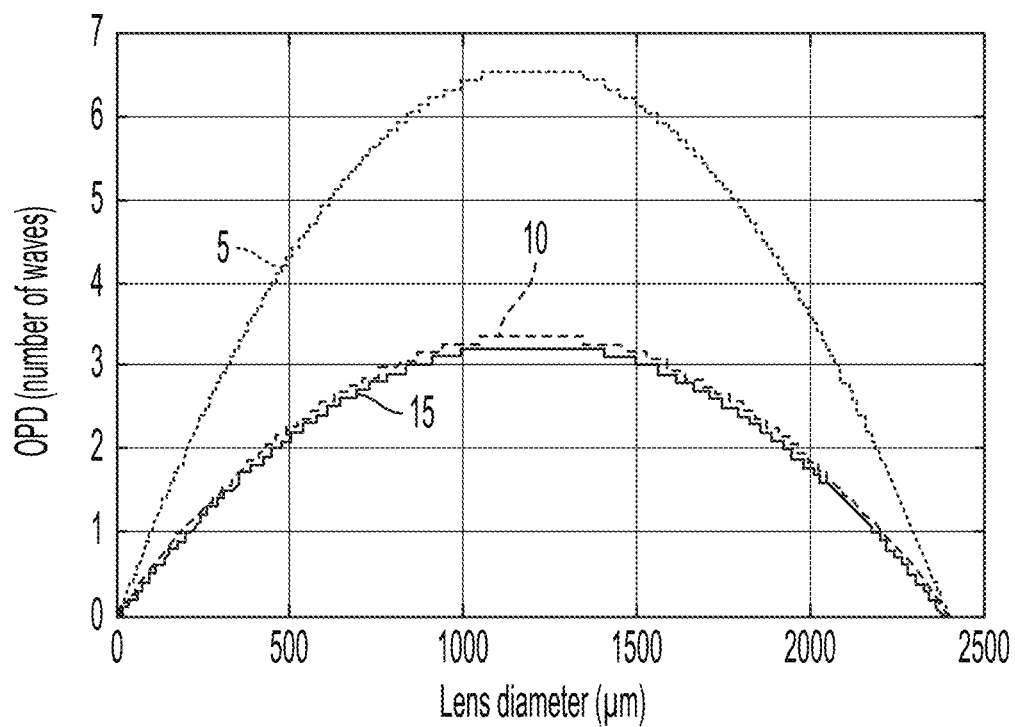
FIG. 10a is an exemplary phase profile plot.
Figure 11A:
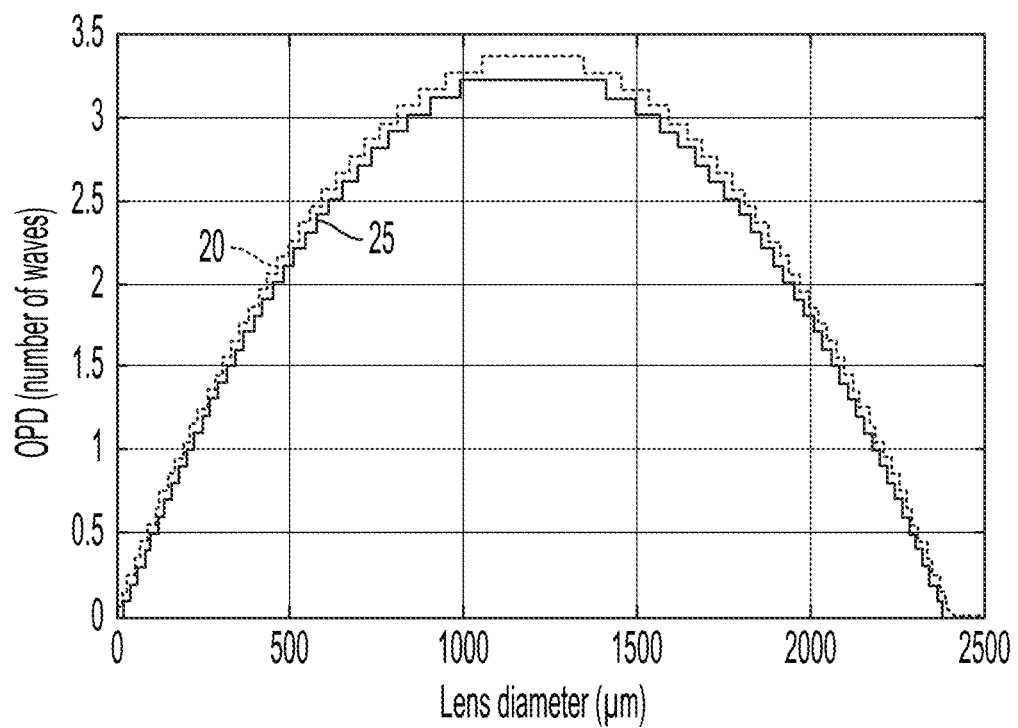
FIG. 11s is an exemplary phase profile plot.
FIG. 11b is an exemplary phase profile plot.

FIG. 10a is a plot of a phase profile for an exemplary modeled stack with double LC lenses, in which the stack has an effective focal length fm200 mm with a sampling rate of 10 phase steps per wave. Such a stack can utilize a total of 66 electrodes. The width of each of these electrodes can be calculated, and/or the total phase profile in the stairs can be as shown. Therefore, with the above method, the electrode patterns for two component lenses can be calculated. Lens number two can have 33 electrodes, the electrode pattern can be the same as calculated for a single lens with f=400 mm, and/or the phase profile can be as shown in FIG. 10a. The calculated outermost ring can have the same size as the outer radius of the lens such that lens number one can have 34 electrodes. The inner radius of the $65^{th}$ ring of the stack can determine the radius of the $33^{rd}$ electrode of this lens. The $65^{th}$ ring can be the last ring defined for the stack, but its outer radius can be smaller than the outer radius of the lens radius, meaning one more electrode can be needed with its outer radius substantially equal to the outer radius of the lens. The phase profile for lens number one can be obtained by subtracting the profile of lens number two from the stack as shown in FIGS. 11a and 11b.

Figure 11B:
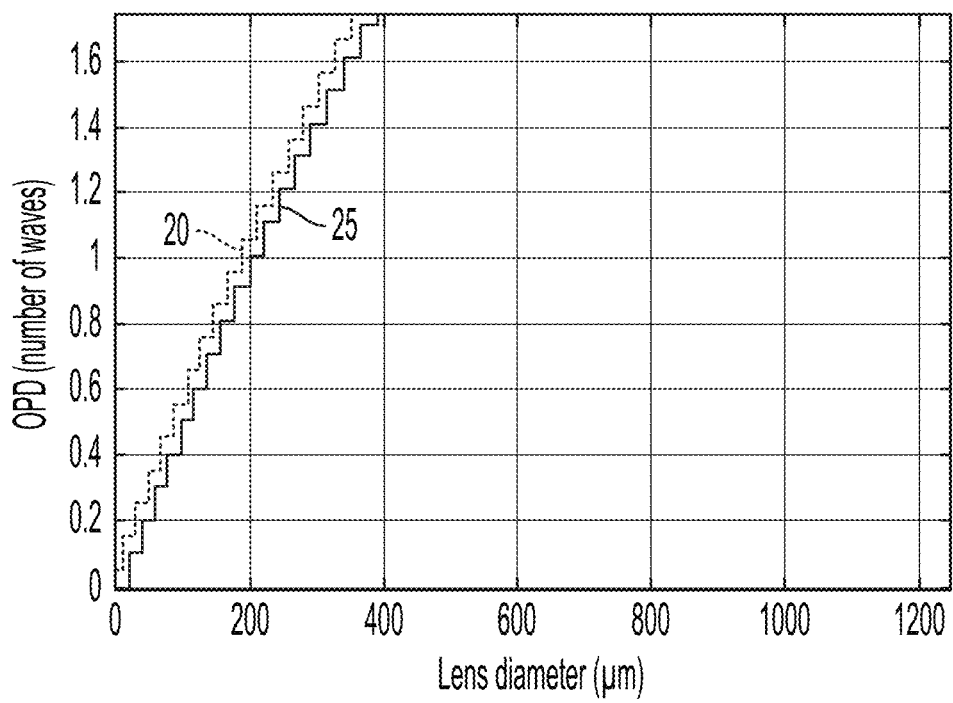

The voltages on lens number one (except the center ring) can be substantially the same as lens number two (for a 400 mm lens), and/or a slightly lower voltage than the one on the second electrode can be applied on the central electrode to give a one tenth of a wavelength difference as shown in FIG. 11b. Each lens itself still can have a sampling rate of 10 phase steps per wave when it is used individually without a stack.

Figure 10B:
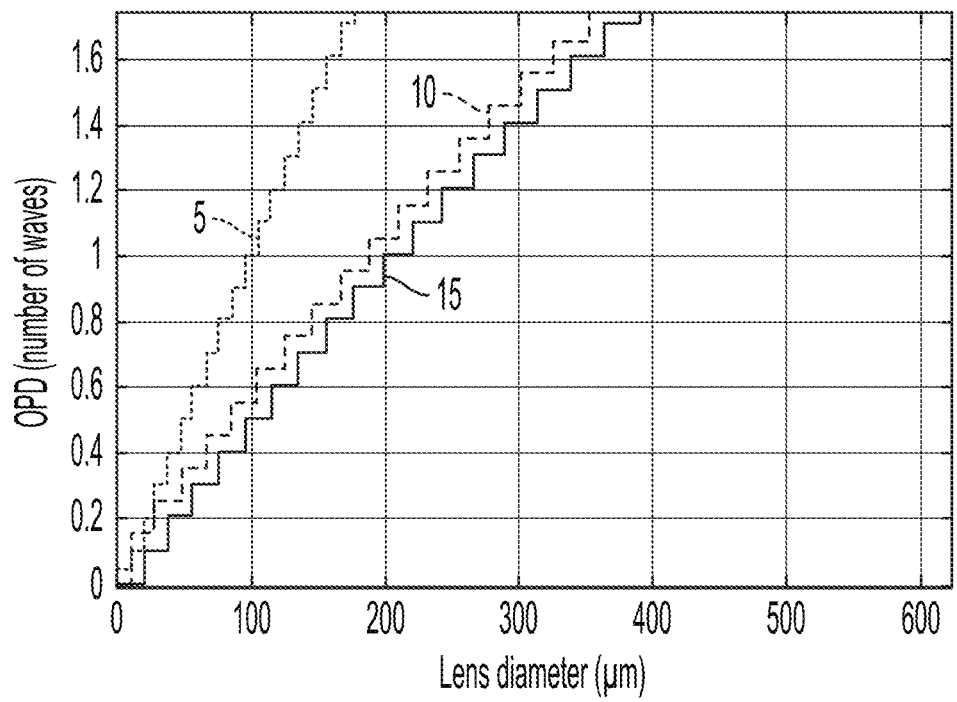
FIG. 10b is an exemplary phase profile plot.

FIG. 10a shows phase profiles of two component lenses and also show the total stack in stairs. FIG. 10b shows a close-up of the edges of the phase profiles shown in FIG. 18a. FIG. 11a shows a phase profile of the original LC lens design and the new design for stacking. FIG. 11b shows a close-up view at the outer areas of the phase profiles shown in FIG. 11a. In FIGS. 10a and 10b, plot 5 refers to an electrode design for f=200 mm, 10 steps per wavelength, plot 10 refers to the new electrode design for stacking, and plot 15 refers an electrode design for f=400 mm, 10 steps per wavelength. In FIGS. 11a and 11b, plot 20 refers to the profile of the first lens and plot 25 refers to the profile of the second lens.

The optical efficiency for this modeled LC lens stack in the form of a strehl ratio can be calculated as 96.6%, which can be the same as the analytical result for a sampling rate of 10 phase steps per wavelength, assuming stairs with no smoothness between steps in the profile. It is believed the efficiency of the real LC lens stack can reach 98.5% because of the smoothness of the edges in the profile caused by the fringing field, a relatively small separation between the lenses, and/or a relatively small misalignment between the lenses, their rings, and/or their electrodes.

More generally, if the stack comprises a certain number of component lenses M(M≥N), the outer radius of every $M^{th}$ ring of the stack can be treated as defining the electrode pattern on each lens.

If the number of lenses M is a whole number divisor of the total number of rings N needed in the stack, the electrode pattern of each $M^{th}$ lens can be totally defined by the stack, as the outermost ring can have the same outer radius as the lens outer radius as defined by the formula shown in FIG. 12. Thus, for the $1^{st}$ to $(M-1)^{th}$ lenses, the last ring of the stack can be the second to the last of the electrode pattern, and/or the outermost electrode can be added with its outer radius equal to lens radius as defined by the formula shown in FIG. 13.

If M is not a whole number divisor of N, such that there is a remainder Mod (N/M), the electrode pattern for each lens can become somewhat more complicated. For all the lenses, the last ring of the stack can be the second to the last of the electrode pattern, such that r=ir, and/or the outermost ring can have an outer radius equal to the outer radius of the lens. Depending on whether m is smaller or larger than Mod, the expressions can be slightly different, for the lens m smaller than Mod, there can be an extra ring as defined by the formulas shown in FIG. 14 and in FIG. 15.

With this method, when designing a lens with higher optical power, two or more lenses with smaller thickness can be designed and/or stacked so that the switching speed remains fast, and/or the optical efficiency remains high.

In a real stack, misalignment of the lens, such as with respect to their corresponding cells, rings, and/or electrodes, can be inevitable. If two lenses are misaligned, the total efficiency of the stack can be affected. We have calculated total efficiency of a modeled stack as a function of the misalignment between two of its cells.

To do so, an analytical expression and/or formula can be relied upon to demonstrate the relationship between the efficiency, lens OPD, and misalignment as shown in FIG. 16:

Here, Δd is the distance between the centerlines of two lenses (i.e., Δd is the perpendicular distance between two lines that each pass through the center of their respective lens and are perpendicular to the face of that lens as measured in all directions extending perpendicularly from the line), c is a constant, and q is the efficiency. If there is no misalignment Δd=0, and the efficiency becomes 1. If there is maximum misalignment Δd=r, the efficiency becomes 0. If the lens OPD increases by having a shorter focal length f, with the same Δd, the efficiency becomes smaller. Therefore, the misalignment can be characterized as in the formula shown in FIG. 17 and/or an optical calculation can be used to numerically calculate the efficiency according to a different misalignment.

In the case of an ideal LC stack, if two of its lenses are misaligned, the calculated strehl ratio can drop accordingly, normalized to an ideal lens with half focal length (Table 1).

TABLE 1

Strehl ratio for an exemplary stack comprising two ideal LC lenses with no separation as a function of misalignment.

| Misalign | 0 | 0.055 | 0.110 | 0.166 | 0.221 | 0.276 |
|---|---|---|---|---|---|---|
| Strehl ratio | 100% | 99.94% | 99.02% | 97.4% | 94.98% | 91.34% |

Interestingly, we have found that if two identical LC lenses with phase steps are misaligned, the efficiency can increase first when they are off a small distance (e.g., less than approximately 30 µm), which is very likely due to an increase of the sampling rate effectively. Then, it can drop as misalignment further grows (Table 2).

TABLE 2

Strehl ratio for an exemplary stack comprising two ideal LC lenses as a function of misalignment, normalized to an ideal lens with focal length f = 200 mm

| Misalign (mm) | 0 | 0.028 | 0.055 | 0.083 | 0.110 |
|---|---|---|---|---|---|
| Strehl ratio | 94% | 95.4% | 95.08% | 94.62% | 93.4% |

There can be a separation between two cells, which can have a thickness of two pieces of glass substrates (e.g., approximately 0.8 mm given that the thickness of the glass use for our exemplary LC lens was modeled as approximately 0.4 mm). Surprisingly, after taking this gap into account, the calculated strehl ratio for an exemplary modeled stack comprising two LC lenses with no misalignment becomes even higher than without a gap, indicating that a separation between lenses can have a similar effect as increasing the sampling rate (Table 3). However, there was no calculated efficiency jump when the misalignment was small as it is generally decreasing as the alignment becomes worse. Therefore, when stacking two ideal LC lenses having an approximately 0.4 mm glass substrate, the alignment of the two lenses can be controlled well, but a good efficiency doesn't necessarily require high precision as long as two lenses are misaligned less than approximately 50 µm.

TABLE 3

Strehl ratio for an exemplary stack comprising two ideal LC lenses separated approximately 0.8 mm apart as a function of misalignment, normalized to two ideal lenses with the same separation.

| Misalign (mm) | 0 | 0.028 | 0.055 | 0.083 | 0.110 | 0.138 | 0.276 |
|---|---|---|---|---|---|---|---|
| Strehl ratio | 96.86% | 95.58% | 95.87% | 95.4% | 94.59% | 93.48% | 84.75% |

In general, off-axis performance can be greatly dependent on the oblique angle of the incident light, and/or inherently, the birefringence of an LC lens can be dependent on the angle of light polarization with respect to its director. Even though the voltage profile or the phase profile for on-axis light can be optimized, as confirmed with interferogram measurement, the off-axis light can see a different OPD from normal incident and/or on-axis light when it passes through an LC lens under the same voltage profile.

Unless an external field is applied, the direction of preferred orientation of liquid crystal molecules in the neighborhood of any point (i.e., the "director") is free to point in any direction. It is possible, however, to force the director to point in a specific direction by introducing an outside agent to a liquid crystal lens system. For example, when a thin polymer coating(usually a polyimide) is spread on a glass substrate and rubbed in a single direction with a cloth, it is observed that liquid crystal molecules in contact with that coated surface tend to align with the rubbing direction.

Figure 18:
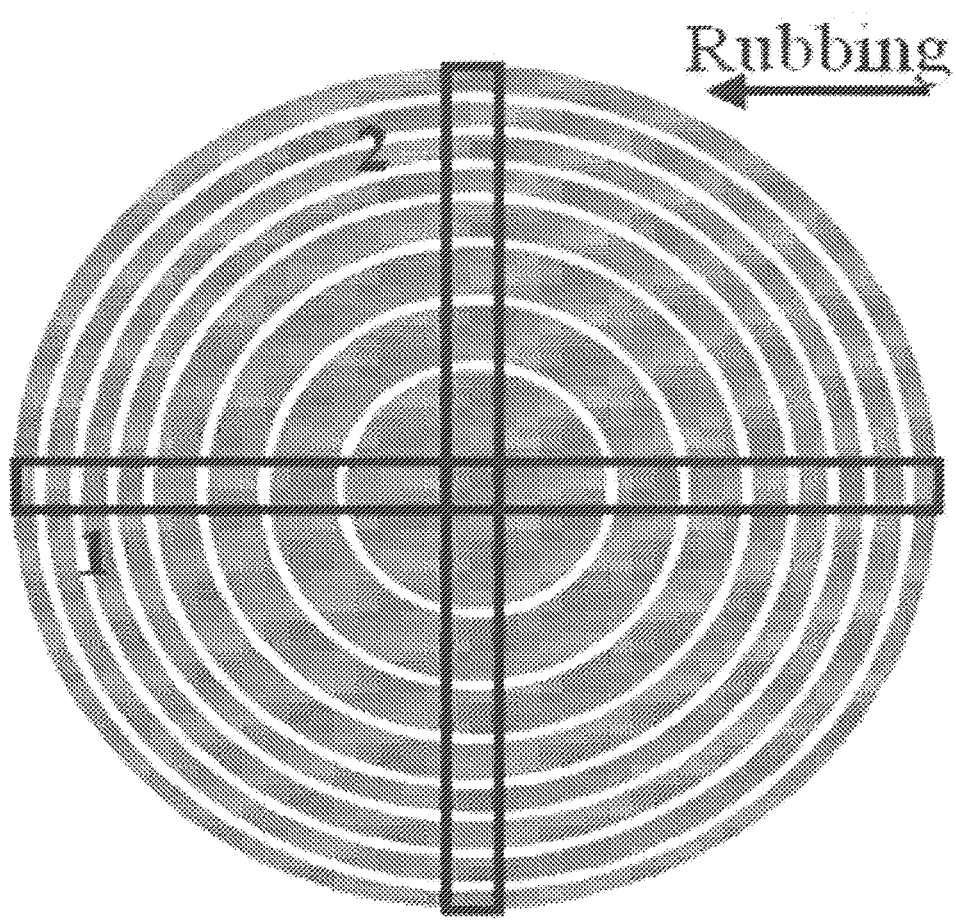
FIG. 18 is a top view of an exemplary embodiment of a liquid crystal lens.

As there can be only one common rubbing direction in the cell of a typical LC lens, there can be two radial axes where either the electrodes are perpendicular to the rubbing direction or they are parallel to the rubbing direction (FIG. 18). In fact, one radial axis of the lens can be independent of viewing angle, which is the area where the tangential of the electrodes is parallel to the rubbing direction (FIG. 18, number 2), because as the light goes off axis, the polarization of the light and its angle with respect to the directors can remain the same. As a result, the effective refractive index of an LC lens and/or the OPD of the LC lens can be the same for both on-axis and off-axis light.

FIG. 18 is a top view of an exemplary LC lens with concentric rings, showing a radial axis where the electrodes are perpendicular (1) and parallel (2) to the rubbing direction.

For such a lens, one worst case scenario can be where the electrodes are perpendicular to the rubbing direction. To investigate how serious the issue can be, an exemplary LC lens can be modeled with a focal length f=400 mm, a thickness of 10 µm, 10 phase steps/wave, and 1 µm electrode gaps. The voltage profile can be optimized fora perfectly parabolic phase profile for on-axis incident light. Once the director orientation of the LC lens is obtained, the effective OPD of an LC lens with a different off-axis light angle (e.g., 10°, 20°, etc.) can be calculated based on the Extended Jones method or via a commercially available software design package such as Zemax or Code V.

Figure 19A:
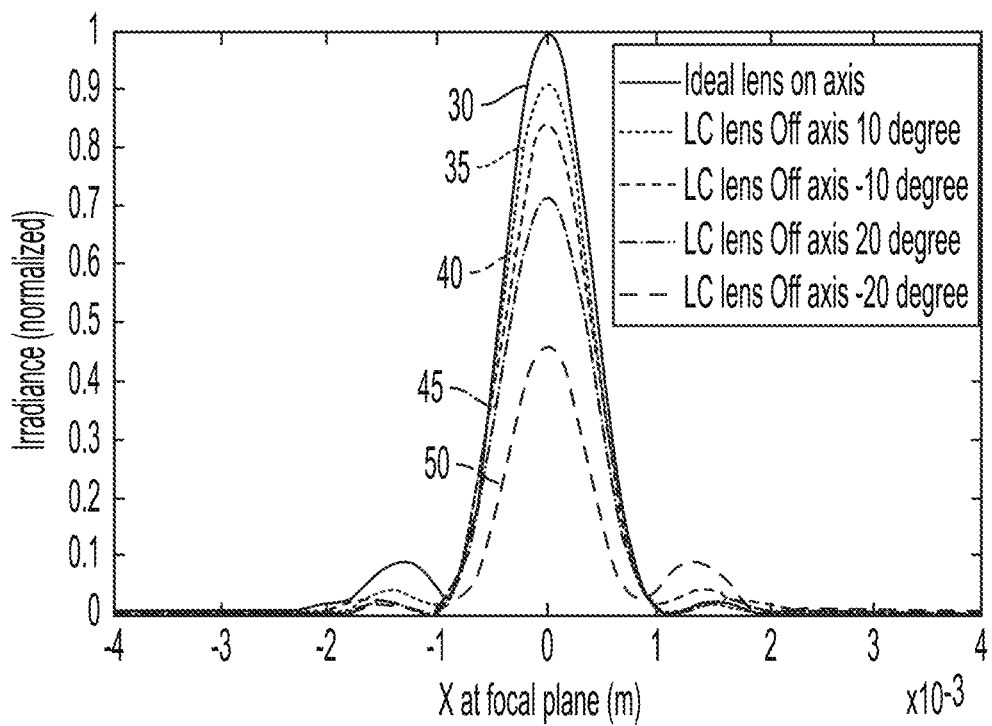
FIG. 19a is an exemplary plot.
Figure 19B:
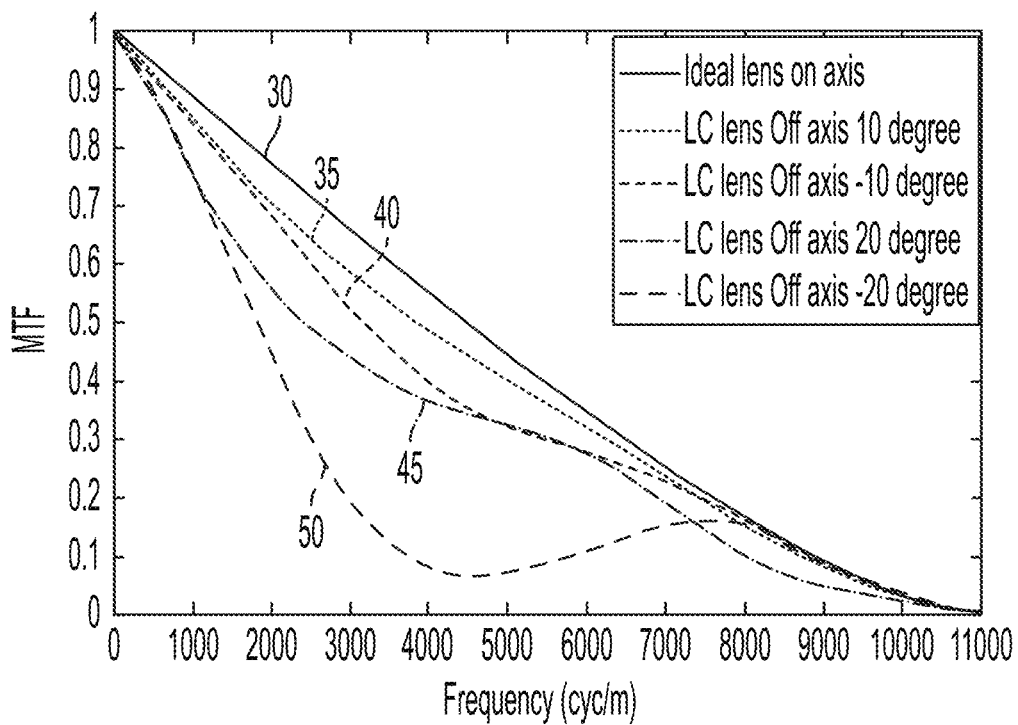
FIG. 19b is an exemplary plot.

In doing so, it can be shown that the OPD across the lens aperture can start to deviate from an ideal parabolic profile as the off-axis angle increases (see Table 4), and/or the basic shape of the profile can become no longer parabolic, which can induce a great amount of aberrations and/or can negatively affect LC lens wide-angle performance. Moreover, because LC directors can have preferred tilt angles, the effective OPD for the light striking the LC lens from a positive angle won't necessarily be the same as for that of light striking the LC lens from a negative angle. The case with negative off-axis light can be worse than its counterpart with positive oblique light. For an LC lens, the strehl ratio and/or Modulation Transfer Function ("MTF") can be calculated, either of which can indicate significant image degradation with wide angle light, such as shown in FIGS. 19a and 19b, and in Table 4. In FIGS. 19a and 19b, plot 30 shows an ideal LC lens with on-axis light applied to it, plot 35 shows the light off-axis by positive 10 degrees, plot 40 shows the light off-axis by negative 10 degrees, plot 45 shows the light off-axis by positive 20 degrees, and plot 50 shows the light off-axis by negative 20 degrees. FIG. 19a shows strehl ratio and plot 19b shows MTF at the various off-axis angles.

TABLE 4

Calculated OPD wavefront error RMS for off-axis light and the corresponding strehl ratio.

|  | 10° | −10° | 20° | −20° |
|---|---|---|---|---|
| Wavefront Error RMS (λ) | 0.098 | 0.103 | 0.2219 | 0.2385 |
| Strehl Ratio | 91.33% | 83.88% | 71.32% | 46.17% |

Disregarding the LC material's angular dependence, it can be interesting to calculate off-axis performance of a thin lens with a fixed and ideal OPD for on-axis light, and to see how much of the efficiency drop of the LC lens with off-axis light can come from the fact that it is off-axis light. For example, the light distribution on the same observation plane can be calculated for an ideal lens f=400 mm with on-axis light and 20° off-axis light, and it shows that the strehl ratio drops to 97%, and the MTF shows a very small deviation from diffraction limited (FIG. 6). Therefore, it appears that the efficiency drop of LC lenses for off-axis light is mainly caused by the LC material's angular dependence.

Figure 20A:
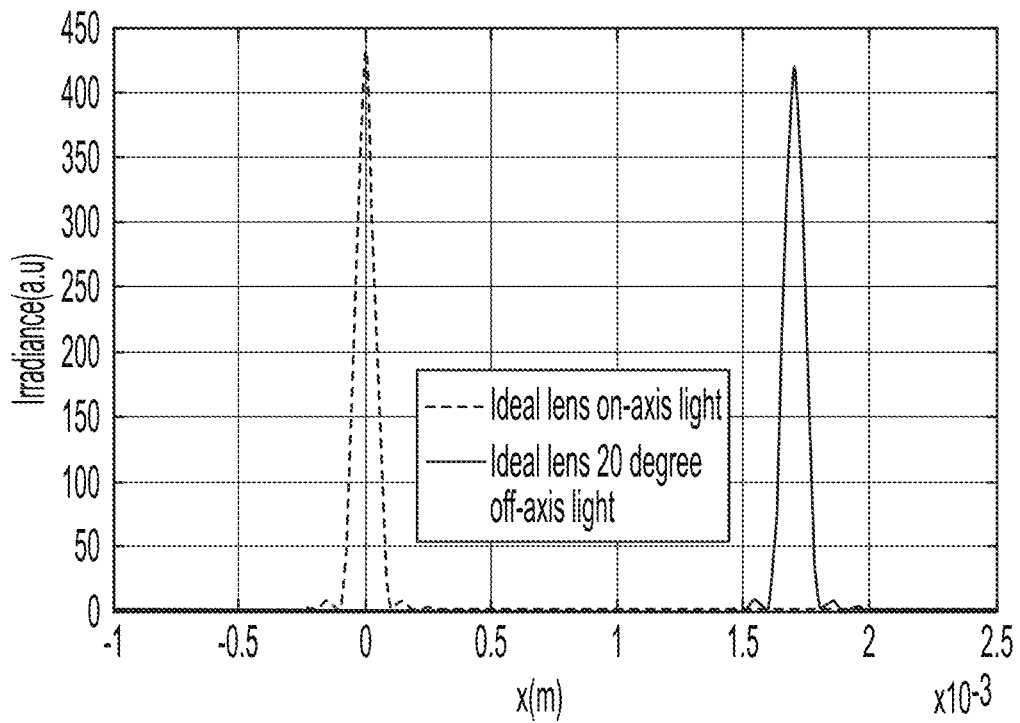
FIG. 20a is an exemplary plot.
Figure 20B:
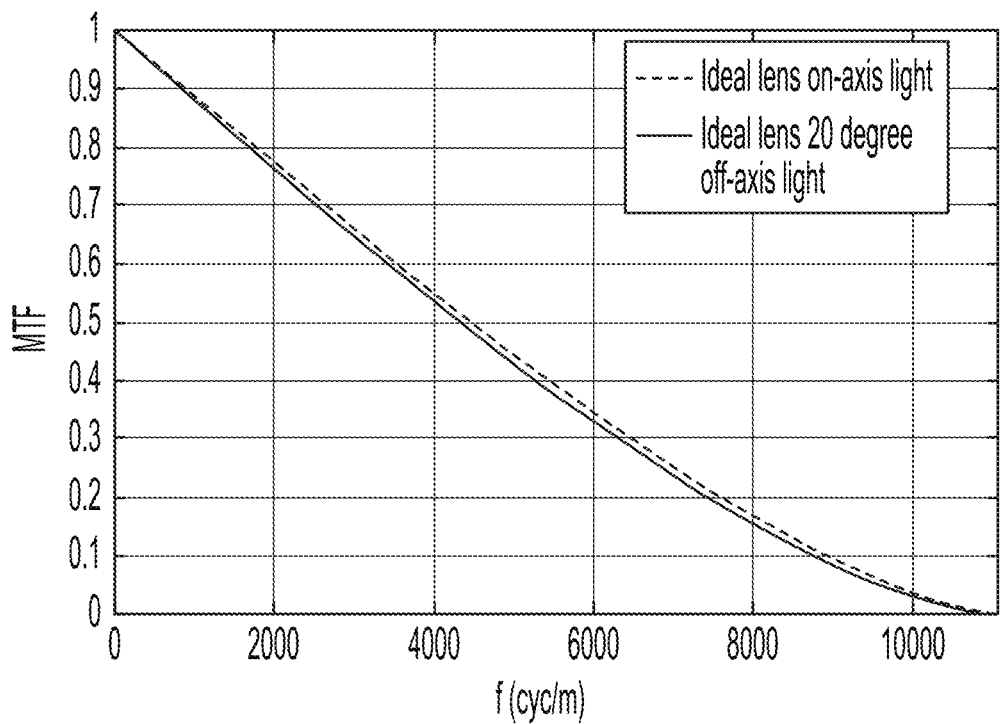
FIG. 20b is an exemplary plot.

FIG. 20a presents a calculated streh ratio for an ideal lens with 20° off-axis light, compared to on-axis light. FIG. 20b presents a calculated MTF for on-axis and off-axis light.

To improve the performance for off-axis light, we propose a simple approach to minimize the aberrations: dual lenses with anti-parallel alignment, which can require dual lenses attached with opposite rubbing direction. This arrangement can give double optical power, faster switching time, and/or improved off-axis performance, which can be because when the off-axis light passes through dual lenses, the phase error caused by one lens can be greatly compensated by the other one with an opposite aberration. In total, the phase profile aberrations can be greatly minimized.

In order to minimize the off-axis effect, we modeled the use of dual LC lenses with opposite rubbing direction (5 μm thick for each). In this case, we calculated the effective OPD of dual cells with anti-parallel alignment at different off-axis angles (10°, 20°), and compared to the results for a dual LC lens (a parallel stack is optically substantially equal to a single lens of 10 μm) at same rubbing direction, assuming gapless.

In doing so, we learned that because there can be only one common rubbing direction in the cell, them can be two radial areas where either the electrodes are perpendicular to the rubbing direction as shown for element 1 of FIG. 18, case 1 or they are parallel to the rubbing as shown for element 2 of FIG. 18.

If two cells are parallel, the phase profiles can be different for +θ and −θ incident light. That is, for such profiles, the calculation results show a large OPD difference in both the depth and the shape. For example, if two cells are anti-parallel, +θ incident light on the bottom cell can have a −θ angle incident on the top cell. Therefore, as the total OPD can be the sum of 2 individual cells, it can be the same for +θ and −θ incident light. The calculation results show a good OPD with little deviation from the ideal phase profile. The calculated PSP and MTF both show that dual lenses with anti-parallel alignment can have much better performance than parallel alignment or a single 10 μm cell at the same oblique incident light.

No matter whether two cells are parallel or anti-parallel, the total OPD can be the same for a certain +θ and −θ incident light, and the optical performance can be the same for both cases. In fact, optical performance need be no different from that of on-axis incident light as the polarization direction remains the same regardless of the oblique angles.

The calculation results show a good OPD with little deviation from the ideal phase profile, which can be due to the phase steps. The calculated Point Spread Function ("PSF") and MTF both show very good performance, almost the same as an ideal lens (the minor drop can be due to the phase steps).

The off-axis performance for area with rubbing parallel to the electrode can be much better than that with a rubbing direction perpendicular to the electrode. This tendency can be improved by the use of dual anti-parallel lenses.

Electro-optic lenses that are designed in the manner described above can have potential uses in numerous applications, including but not limited to, photography, remote sensing, biomedical diagnostic imaging equipment, security systems, military and environmental imaging, vision correction and computer gaming. For example, the electro-optic lens described above can be implemented in auto-focus lens systems, zoom and wide-angle lens systems, and/or aberration correction lens systems. Since any of the application fields listed above can use one or more of these systems, they can profit from the improvement derived from eliminating the problems of haze, stray light, and/or de-focus that this double-electrode layer approach can mitigate.

Certain exemplary embodiments can provide an electro-optic device comprising:
  a first electrode structure comprising:
    a first electrode layer comprising a concentric first plurality of electrode rings, each adjacent pair of electrode rings from said first plurality of electrode rings separated by a corresponding first layer separator from a concentric plurality of first layer separators; and
    a second electrode layer comprising a concentric second plurality of electrode rings, each adjacent pair of electrode rings from said second plurality of electrode rings separated by a corresponding second layer separator from a concentric plurality of second layer separators;
  wherein:
    said first electrode layer is positioned parallel to said second layer and, when viewed perpendicular to said first electrode layer, said first plurality of electrode rings is offset and substantially non-overlapping with respect to said second plurality of electrode rings;
    said first electrode layer is separated from said second electrode layer by an insulating layer,
    said first electrode layer is separated from said second electrode layer by a contiguous insulating layer;
    said first electrode layer is separated from said second electrode layer by an insulating layer formed from silicon dioxide;
    said first electrode layer is electrically insulated from said second electrode layer,
    each of said concentric plurality of first layer separators is adapted to be individually controlled;
    said concentric plurality of first layer separators is formed via photolithography,
    said concentric plurality of first layer separators is formed from indium tin oxide;
    said first electrode layer is electrically coupled to a power supply via a first bus, and said second electrode layer is electrically coupled to a power supply via a second bus;

said first electrode structure is adapted to border a liquid crystal;

said electrode structure is adapted to create a voltage gradient across a liquid crystal;

said electrode structure is adapted to create an index of refraction gradient in an adjacent liquid crystal material;

said first electrode structure is adapted to electrically co-operate with a second electrode structure to generate an electric field;

said first electrode structure and a second electrode structure border a liquid crystal material, said first electrode structure and said second electrode structure adapted to electrically co-operate to generate an electric field across said liquid crystal material;

said first electrode structure and a second electrode structure border a liquid crystal material, said first electrode structure and said second electrode structure adapted to electrically co-operate to generate a radially varying electric field across said liquid crystal material;

said first electrode structure and a second electrode structure border a liquid crystal material, said first electrode structure and said second electrode structure adapted to electrically co-operate to generate a radial gradient in an index of refraction in said liquid crystal material; said first electrode structure is adapted to form a spherical lens;

said first layer separators are insulating rings; and/or said first layer separators are gaps.

Certain exemplary embodiments can provide an electro-optic device comprising:

an electrode structure comprising a plurality of optically edge-less electrodes.

Certain exemplary embodiments can provide a method comprising:

in an electro-optic device comprising a first electrode structure comprising:
a first electrode layer comprising a concentric first plurality of electrode rings, each adjacent pair of electrode rings from said first plurality of electrode rings separated by a corresponding first layer separators from a concentric plurality of first layer separators; and
a second electrode layer comprising a concentric second plurality of electrode rings, each adjacent pair of electrode rings from said second plurality of electrode rings separated by a corresponding second layer separator from a concentric plurality of second layer separators;
wherein:
said first electrode layer is positioned parallel to said second layer, and, when viewed perpendicular to a major face of
said first electrode layer, said first plurality of electrode rings is offset and substantially non-overlapping with respect to said second plurality of electrode rings; and/or
to each of said electrode rings from said first plurality of electrode rings, applying a predetermined voltage, an amplitude of said predetermined voltage unique to each of said electrode rings from said first plurality of electrode rings.

Certain exemplary embodiments can provide a method comprising:

in an electro-optic device, generating a radial gradient in an index of refraction of a liquid crystal material while substantially preventing a diffraction of light at edges of each of a plurality of electrodes that border the liquid crystal material.

Certain exemplary embodiments can provide an electro-optic device comprising:

a first electrode structure comprising:
a first electrode layer comprising a concentric first plurality of electrode rings, each adjacent pair of electrode rings from said first plurality of electrode rings separated by a corresponding first layer separator from a concentric plurality of first layer separators; and
a second electrode layer comprising a concentric second plurality of electrode rings, each adjacent pair of electrode rings from said second plurality of electrode rings separated by a corresponding second layer separator from a concentric plurality of second layer separators;
wherein:
said first electrode layer is positioned parallel to said second layer and, when viewed perpendicular to said first electrode layer, said first plurality of electrode rings is offset and partially overlaps said second plurality of electrode rings;
the first plurality of electrode rings is offset less than approximately 0.028 mm with respect to said second plurality of electrodes;
the first plurality of electrode rings is offset less than approximately 0.055 mm with respect to said second plurality of electrodes; and/or
a rubbing direction associated with the first plurality of electrode rings is substantially opposite a rubbing direction associated with the said second plurality of electrodes.

Certain exemplary embodiments can provide an electro-optic device comprising:

a first electrode structure comprising:
a first electrode layer comprising a concentric first plurality of electrode rings, each adjacent pair of electrode rings from said first plurality of electrode rings separated by a corresponding first layer separator from a concentric plurality of first layer separators; and
a second electrode layer comprising a concentric second plurality of electrode rings, each adjacent pair of electrode rings from said second plurality of electrode rings separated by a corresponding second layer separator from a concentric plurality of second layer separators;
wherein:
said first electrode layer is positioned parallel to said second layer;
a rotational axis of the first electrode layer is coincident with a rotational axis of the second electrode layer, and,
when viewed from a point along the rotational axis, an electrode ring from the first layer is not optically aligned with a a spatially nearest electrode ring of the second layer.

Definitions

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

aberration—one or more limitations and/or defects in an optical component, such as a lens and/or mirror, that is contacted by a plurality of light rays, such limitations and/or defects preventing the light rays from converging at one focus and potentially due to, e.g., the optical component comprising one or more surfaces that are not perfectly planar, such as one or more spherical surfaces.

across—from one side to another.

activity—an action, act, step, and/or process or portion thereof.

adapted to—suitable, fit, and/or capable of performing a specified function.

adapter—a device used to effect operative compatibility between different parts of one or more pieces of an apparatus or system.

adjacent—in close proximity to, near, next to, adjoining, neighboring, contiguous, and/or within a horizontal radius of approximately 0 mm to approximately 0.5 mm, including all values and subranges therebetween.

align—to adjust substantially into a proper orientation and/or location with respect to another thing.

along—through, on, beside, over, in line with, and/or parallel to a length and/or direction of; and/or from one end to the other of.

amplitude—a magnitude of a variable.

and/or—either in conjunction with or in alternative to.

apparatus—an appliance or device for a particular purpose apply—to put to, on, and/or into use, action, and/or service; to implement; to make incident directly and/or indirectly upon; and/or to bring into contact with something.

approximately—about and/or nearly the same as.

associate—to join, connect together, and/or relate, associated with—related to and/or accompanying.

automatic—performed via an information device in a manner essentially independent of influence and/or control by a user. For example, an automatic light switch can turn on upon "seeing" a person in its "view", without the person manually operating the light switch.

axis—a straight line about which a body and/or geometric object rotates and/or can be conceived to rotate and/or a center line to which parts of a structure and/or body can be referred.

beam of light—a projection of light radiating from a source.

Boolean logic—a complete system for logical operations.

border—to be located and/or positioned adjacent to an outer edge, surface, and/or extent of an object.

bound—(n) a boundary, limit, and/or further extent of; (v) to limit an extent.

bus—an electrical conductor that makes a common connection between a plurality of circuits.

by—via and/or with the use and/or help of.

can—is capable of, in at least some embodiments.

cause—to bring about, provoke, precipitate, produce, elicit, be the reason for, result in, and/or effect.

change—(v.) to cause to be different; (n.) the act, process, and/or result of altering or modifying.

circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.

co-Incident—occupying the same area in space, happening at the same time, and/or matching point for point.

co-operate—to work, act, and/or function together and/or in harmony, as opposed to separately and/or in competition.

comprising—including but not limited to.

concentric—having a common central axis.

conductor—an electrically conductive material and/or component adapted to apply a voltage to an electroactive material.

configure—to make suitable or fit for a specific use or situation.

connect—to join or fasten together.

contact—to physically touch and/or come together.

containing—including but not limited to.

contiguous—neighboring and/or adjacent.

control—(n) a mechanical or electronic device used to operate a machine within predetermined limits; (v) to exercise authoritative and/or dominating influence over, cause to act in a predetermined manner, direct, adjust to a requirement, and/or regulate.

controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, California, and/or the HC08 series from Motorola of Schaumburg, Illinois In another embodiment, the controller can be an Application Specific Integrated Circuit (ASIC) or a Field Programmable Gate Array (FPGA) that has been designed to implement in its hardware and/or firmware at least a part of an embodiment disclosed herein.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

couple—to join, connect, and/or link by any known approach, including mechanical, fluidic, acoustic, electrical, magnetic, and/or optical, etc. approaches.

couple(d)—to join, connect, and/or link two things together.

coupleable—capable of being joined, connected, and/or linked together.

coupling—linking in some fashion.

create—to bring into being.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, and/or structure of.

deposit—to put, lay, place, position, and/or set down; and/or to fasten, fix, and/or secure.

determine—to find out, obtain, calculate, decide, deduce, ascertain, and/or come to a decision, typically by investigation, reasoning, and/or calculation.

device—a machine, manufacture, and/or collection thereof.

diffraction—the bending of a light ray in passing an edge formed by contiguous opaque and transparent edges.

digital—non-analog and/or discrete.

direction—a spatial relation between something and a course along which it points and/or moves; a distance independent relationship between two points in space that specifies the position of either with respect to the other; and/or a relationship by which the alignment and/or orientation of any position with respect to any other position is established.

diverge—to go or extend in different directions from a common point.

each—every one of a group considered individually.

edge—a periphery, border, and/or boundary.

edge-less—lacking one or more edges.

electric—powered by electricity, electrically—of, relating to, producing, or operated by electricity.

electrically coupled—connected in a manner adapted to allow a flow of electricity therebetween.

electro-active—a branch of technology concerning the interaction between various properties and electrical and/or electronic states of materials and/or involving components, devices, systems, and/or processes that operate by modifying the certain properties of a material by applying to it an electrical and/or magnetic field. Sub-branches of this technology include, but are not limited to, electro-optics.

electro-active element—a component that utilizes an electro-active effect, such as an electro-active filter, reflector, lens, shutter, liquid crystal retarder, active (i.e., non-passive) polarity filter, electro-active element that is movable via an electro-active actuator, and/or conventional lens movable by an electro-active actuator.

electro-optic—a branch of technology concerning the interaction between the electromagnetic (optical) and the electrical (electronic) states of materials and/or involving components, devices, systems, and/or processes that operate by modifying the optical properties of a material by applying to it an electrical field.

electrode—an electrically conducting element that emits and/or collects electrons and/or ions and/or controls their movement by means of an electric field applied to it.

emanate- to emit, radiate, and/or shine.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

etch—to wear away the surface of material(such as a metal, glass, etc.) by chemical action, such as the action of an acid.

field—a region of space characterized by a physical property, such as gravitational or electromagnetic force or fluid pressure, having a determinable value at every point in the region.

first—an initial cited element of a set, sequence, and/or ordering.

flat—having a substantially planar major face and/or having a relatively broad surface in relation to thickness or depth.

form—to produce, make, create, generate, construct, and/or shape.

formed—constructed.

Fresnel lens—a thin optical lens comprising concentric rings of segmental lenses.

from—used to indicate a source.

gap—an interruption in continuity, delay, pause, break, opening, cleft, gulf, rift, space, recess, interval, hiatus, and/or difference.

generate—to create, produce, give rise to, and/or bring into existence.

gradient—a rate of change with respect to distance of a variable quantity.

grid—a network of lines, real or conceptual, that cross each other to from a series of regular shapes.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

human-machine interface—hardware and/or software adapted to render information to a user and/or receive information from the user; and/or a user interface.

Illuminate—to provide and/or brighten with light.

Impinge—to collide and/or strike.

including—including but not limited to.

index of refraction—a measure of the extent to which a substance slows down light waves passing through it. The index of refraction of a substance is equal to the ratio of the velocity of light in a vacuum to its speed in that substance. Its value determines the extent to which light is refracted when entering or leaving the substance.

Indium tin oxide—a solid solution of indium(III)oxide (In2O3) and tin(1V) oxide (SnO2), typically 90% In2O3, 10% SnO2 by weight, that is typically transparent and colorless in thin layers and can serve as a metal-like mirror in the infrared region of the electromagnetic spectrum. It is a widely used transparent conducting oxide due to its electrical conductivity and optical transparency. Thin films of indium tin oxide are most commonly deposited on surfaces by electron beam evaporation, physical vapor deposition, and/or a range of sputter deposition techniques.

individually—of or relating to a distinct entity.

Information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone-like and/or Treo-like device), messaging service(e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (T/O) devices, one or more user interfaces coupled to an I/O device, etc.

initialize—to prepare something for use and/or some future event.

input/output (I/O) device—any device adapted to provide input to, and/or receive output from, an information device. Examples can include an audio, visual, haptic, olfactory, and/or taste-oriented device, including, ror example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

install—to connect or set in position and prepare for use.

instructions—directions, which can be implemented as hardware, firmware, and/or software, the directions adapted to perform a particular operation and/or function via creation and/or maintenance of a predetermined physical circuit.

insulate—to resist heat flow and/or current flow.

insulating—having a substantial resistance to the flow of electrical current.

layer—a continuous and relatively thin material, region, stratum, course, lamina, coating, and/or sheet having one or more functions. Need not have a constant thickness.

lens—a piece of transparent substance, often glass and/or plastic, having two opposite surfaces either both curved or one curved and one plane, used in an optical device for changing the convergence and/or focal point of light rays; an optical device for changing the convergence and/or focal point of light rays; and/or an optical device that transmits light, refracts light, and/or is adapted to cause the light to concentrate and/or diverge.

less than—having a measurably smaller magnitude and/or degree as compared to something else.

light—electromagnetic radiation having a wavelength within a range of approximately 300 nanometers to approximately 1000 nanometers, including any and all values and subranges therebetween, such as from approximately 400 to approximately 700 nm, from the near infrared through the long wavelength, far infrared, and/or from the ultraviolet to X-rays and/or gamma rays.

light source—a device adapted to emit light responsive to an applied electrical current.

liquid—a body of matter that exhibits a characteristic readiness to flow, little or no tendency to disperse, and relatively high incompressibility, including pumpable and/or flowable slurries and/or suspensions.

liquid crystal—any of various liquids in which the atoms or molecules ar regularly arrayed in either one dimension or two dimensions, the order giving rise to optical properties, such as anisotropic scattering, associated with the crystals.

locate—to place, set, find, and/or situate in a particular spot, region, and/or position.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false"(a.k.a., "low" or "0") or "true"(a.k.a., "high" or "1"), represented by different voltage levels, yet the logic state of a terminal can, and generally docs, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01 101100", which encodes a total of 8 "bits"(one byte), where each value of either "0" or "I" is called a "bit" (and 8 bits are collectively called a "byte"). Note that because a binary bit can only have one of two different values (either "0" or ")"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "V"'s and "t"'s as numbers per se, but typically as voltage levels (in the case of an electronically-implemented computer), for example, a high voltage of approximately +3 volts might represent a "I" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain one or more machine-implementable instructions, data, and/or information. Examples include a memory device, punch card, player-piano scroll, etc.

match—to mirror, resemble, harmonize, fit, correspond, and/or determine a correspondence between, two or more values, entities, and/or groups of entities.

material—a substance and/or composition.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not preempting all uses of a fundamental principal.

mm—millimeters.

nearest—closest in physical proximity to.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, Bluetooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network Interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

non-overlapping—not substantially extending over and/or covering a part of.

not—a negation of something and/or in no way.

offset—in a location near to but distinguishable from a given point or area.

opposing—opposite; against; being the other of two complementary or mutually exclusive things; placed or located opposite, in contrast, in counterbalance, and/or across from something else and/or from each other.

opposite—facing away from.

optical—of or relating to light, sight, and/or a visual representation.

optically edge-less—substantially lacking an ability to bend light due to interaction of the light with a discontinuity and/or edge.

overlap—(n) a part and/or portion that overlaps and/or is overlapped; (v) to extend over and/or cover a part of.

packet—a generic term for a bundle of data organized in a specific way for transmission, such as within and/or across a network, such as a digital packet-switching network, and comprising the data to be transmitted and certain control information, such as a destination address.

pair—a set of two items.

parallel—of, elating to, and/or designating lines, curves, planes, and/or surfaces everywhere equidistant and/or an arrangement of components in an electrical circuit that splits an electrical current into two or more paths.

partially—to an extent, but not necessarily totally.

perceptible—capable of being perceived by the human senses.

perpendicular—intersecting at or forming substantially right angles; and/or substantially at a right angle with respect to an axis.

phase—a relationship in time between successive states and/or cycles of an oscillating and/or repeating system (such as an alternating electric current, one or more light waves, and/or a sound wave) and: a fixed reference point; the states of another system; and/or the cycles of another system.

photolithography—a process whereby metallic foils, fluidic circuits, and/or "printed" electrical circuits can be created by exposing a photosensitive substrate to a pattern, such as a predesigned structural pattern and/or a circuit pattern, and chemically etching away an exposed and/or unexposed portion of the substrate.

photon—a particle representing a quantum of light and/or other electromagnetic radiation, the particle having zero rest mass and carrying energy proportional to the frequency of the radiation.

physical—tangible, real, and/or actual.

physically—existing, happening, occurring, acting, and/or operating in a manner that is tangible, real, and/or actual.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.

portion—a part, component, section, percentage, ratio, and/or quantity that is less than a larger whole. Can be visually, physically, and/or virtually distinguishable and/or non-distinguishable.

position—to put in place or position.

power—a measure of an ability of a vision system, eye, lens, and/or lens-assisted eye, to refract, magnify, separate, converge, and/or diverge; and/or a general term that may refer to any power such as effective, equivalent, dioptric, focal, refractive, surface, and/or vergence power.

power supply—a source of electrical power.

pre- a prefix that precedes an activity that has occurred beforehand and/or in advance.

predetermined—established in advance.

prevent—to impede, hinder, stop, and/or keep from happening.

probability—a quantitative representation of a likelihood of an occurrence.

processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or muting the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, California In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmatically—of, relating to, or having a program and/or instructions.

project—to calculate, estimate, or predict.

provide—to furnish, supply, give, and/or make available.

radial—pertaining to that which moves and/or is directed along a radius and/or radiates from and/or converges to a common center and/or has or is characterized by parts so arranged or so radiating.

receive—to get as a signal, take, acquire, and/or obtain.

recommend—to suggest, praise, commend, and/or endorse.

reduce—to make and/or become lesser and/or smaller.

reader—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

ring—a substantially toroidal object that can be imagined as having been generated by rotating a closed loop (e.g., ellipse, circle, irregular curve, polygon, etc.) about a fixed line external to the loop.

rotational—about and/or around an axis.

rubbing direction—a direction in which a polymer applied to the surface is rubbed.

said—when used in a system or device claim, an article indicating a subsequent claim term that has been previously introduced.

scene—a place where action occurs and/or where an object of interest is present; something seen by a viewer, and/or a view and/or prospect.

second—immediately following an initial item in an ordering.

select—to make a choice or selection from alternatives.

separated—not touching and/or spaced apart by something.

separator—a portion of a device and/or apparatus that comprises a separating medium and/or a structure substantially supporting, retaining, and/or confining the separating medium.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

silicon dioxide—a.k.a, "silica"; a white or colorless vitreous insoluble solid (SiO2); various forms occur widely in the earth's crust as e.g., quartz, cristobalite, tridymite, lechatelierite, etc.

solid angle—a three-dimensional angle, formed by three or mom planes intersecting at a common point. Its magnitude is measured in steradians, a unitless measure. The corner of a mom forms a solid angle, as does the apex of a cone; one can imagine an indefinite number of planes forming the smooth round surface of the cone all intersecting at the apex. Solid angles are commonly used in photometry.

spatially—existing and/or occurring in space.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

spherical—of, relating to, and/or having a shape approximating that of a sphere.

store—to place, hold, and/or retain data, typically in a memory, structure—something made up of a number of parts that are held and/or put together in a particular way, substantially—to a great extent and/or degree.

substrate—an underlying material, region, base, stratum, course, lamina, coating, and/or sheet.

sufficiently—to a degree necessary to achieve a predetermined result.

supply—to make available for use.

support—to bear the weight of, especially from below.

surface—the outer boundary of an object and/or a material layer constituting and/or resembling such a boundary.

switch—(n.) a mechanical, electrical, and/or electronic device that opens and/or closes circuits, completes and/or breaks an electrical path, and/or selects paths and/or circuits; (v.) to: form, open, and/or close one or more circuits; form, complete, and/or break an electrical and/or informational path; alternate between electrically energizing and de-energizing; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

system—a collection of mechanisms, devices, machines, articles of manufacture, processes, data, and/or instructions, the collection designed to perform one or more specific functions.

that—a pronoun used as the subject or object of a relative clause, and/or used to indicate a thing as indicated, mentioned before, present, and/or well known.

transform—to change in measurable: form, appearance, nature, and/or character.

transmit—to send as a signal, provide, furnish, and/or supply.

transparent—clear; characterized by conveying incident light without reflecting or absorbing a substantial portion of that light; and/or having the property of transmitting rays of light through its substance so that bodies situated beyond or behind can be distinctly seen.

unique—separate and distinct.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, Thot size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

variable-focus—having the quality of adjustable focus in a single specified optic.

vary—to change, alter, and/or modify one or more characteristics and/or attributes of.

via—by way of and/or utilizing.

viewed—looked at, gaze upon, and/or seen, voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wavefront—a surface containing points affected in substantially the same way by a wave at a substantially predetermined time.

weight—a value indicative of importance.

when—at a time and/or during the time at which, wherein—in regard to which; and; and/or in addition to.

while—for as long as, during some portion of the time that, and/or at the same time that.

with—accompanied by.

with respect to—in relation to and/or relative to,

Note

Various substantially and specifically practical and useful exemplary embodiments are described herein, textually and/or graphically, including the best mode, if any, known to the inventor(s), for implementing the described subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the described subject matter to be practiced other than as specifically described herein. Accordingly, as permitted by law, the described subject matter includes and covers all variations, details, and equivalents of that described subject matter. Moreover, as permitted by law, every combination of the herein described characteristics, functions, activities, substances, and/or structural elements, and all possible variations, details, and equivalents thereof, is encompassed by the described subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or mom embodiments and does not pose a limitation on the scope of any described subject matter unless otherwise stated. No language hemin should be construed as indicating any described subject matter as essential to the practice of the described subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:
  there is no requirement for the inclusion of any particular described characteristic, function, activity, substance, or structural element, for any particular sequence of activities, for any particular combination of substances, or for any particular interrelationship of elements;
  no described characteristic, function, activity, substance, or structural element is "essential";
  any two or more described substances can be mixed, combined, reacted, separated, and/or segregated;
  any described characteristics, functions, activities, substances, and/or structural elements can be integrated, segregated, and/or duplicated;
  any described activity can be performed manually, semi-automatically, and/or automatically;
  any described activity can be repeated, any activity can be performed by multiple entities, and/or any activity can be performed in multiple jurisdictions; and
  any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of any claims presented herein or in any document claiming priority hereto) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into and clearly implied as being presented within the specification as if it were individually recited herein. For example, if a range of 1 to 10 is described, even implicitly, unless otherwise stated, that range necessarily includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) described herein or appearing in a claim is followed by a drawing element number, that drawing element number is exemplary and non-limiting on the description and claim scope.

No claim of this document or any document claiming priority hereto is intended to invoke paragraph six of 35 USC 112 unless the precise phrase "means for" is followed by a gerund.

Any information in any material(e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto (including any patent application claiming priority hereto) any reference to any claimed subject matter is intended to reference the precise language of the then-pending claimed subject matter at that particular point in time only.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

The invention claimed is:

1. An electro-optic device comprising:
  a first liquid crystal lens to impart a first phase profile on incident light, the first liquid crystal lens comprising first concentric electrode rings separated by respective first insulating gaps; and
  a second liquid crystal lens, in optical series with the first liquid crystal lens, to further impart a second phase profile on the incident light, the second liquid crystal lens comprising second concentric electrode rings separated by respective second insulating gaps,
  wherein the first concentric electrode rings are positioned over the respective second insulating gaps and the second concentric electrode rings are positioned over the respective first insulating gaps.

2. The electro-optic device of claim 1, wherein the first liquid crystal lens comprises a first liquid crystal layer and the second liquid crystal lens comprises a second liquid crystal layer separated from the first liquid crystal layer by a substrate.

3. The electro-optic device of claim 1, wherein the respective first insulating gaps and the respective second insulating gaps are each about 0.1 micrometers wide to about 10 micrometers wide.

4. The electro-optic device of claim 1, wherein, as seen by an impinging light wave, there appear to be no insulating gaps between the first concentric ring electrodes or the second concentric ring electrodes.

5. The electro-optic device of claim 1, further comprising:
  an insulating layer disposed between the first concentric electrode rings and the second concentric electrode rings.

6. The electro-optic device of claim 1, further comprising:
an electrical power supply; and
buss lines connecting the first concentric electrode rings and the second concentric electrode rings to the electrical power supply.

7. The electro-optic device of claim 6, wherein the buss lines are disposed on an insulating layer and connect to the first concentric electrode rings and/or the second concentric electrode rings through vias in the insulating layer.

8. The electro-optic device of claim 6, wherein the buss lines are disposed on a substrate of the electro-optic device.

9. The electro-optic device of claim 6, wherein the first concentric electrode rings comprise concentric electrode rings connected to the buss lines and configured to transfer electrical power to concentric electrode rings unconnected to the buss lines via capacitance and/or inductance.

10. A method of focusing light with an electro-optic device comprising a first liquid crystal lens and a second liquid crystal lens in optical series with the first liquid crystal lens, the method comprising:
imparting a first phase profile on incident light with a first liquid crystal layer in the first liquid crystal lens with first concentric electrode rings separated by respective first insulating gaps; and
imparting a second phase profile on the incident light with a second liquid crystal layer in the second liquid crystal lens with second concentric electrode rings separated by respective second insulating gaps, and
wherein the first concentric electrode rings are positioned over the respective second insulating gaps and the second concentric electrode rings are positioned over the respective first insulating gaps.

11. The method of claim 10, wherein the respective first insulating gaps and the respective second insulating gaps are each about 0.1 micrometer wide to approximately 10 micrometers wide.

12. The method of claim 10, wherein the first concentric electrode rings and the second concentric electrode rings are separated by an insulating layer.

13. The method of claim 10, further comprising:
conducting electrical power from an electrical power supply to the first concentric electrode rings and/or the second concentric electrode rings via buss lines.

14. The method of claim 13, wherein the buss lines are disposed on an insulating layer and connect to the first concentric electrode rings and/or the second concentric electrode rings through vias in the insulating layer.

15. The method of claim 13, wherein the buss lines are disposed on a substrate of the electro-optic device.

16. The method of claim 10, further comprising:
wirelessly transferring electrical power between concentric electrode rings.

17. An electro-optic device comprising:
a two-layer electrode structure comprising:
a first layer of concentric ring electrodes separated by respective first insulating gaps; and
a second layer of concentric ring electrodes separated by respective second insulating gaps and separated from the first layer of concentric ring electrodes by an insulating layer,
wherein, as seen by an impinging light wave, there appear to be no insulating gaps between adjacent concentric ring electrodes in the two-layer electrode structure.

* * * * *